(12) United States Patent
Lin

(10) Patent No.: US 8,824,647 B2
(45) Date of Patent: Sep. 2, 2014

(54) ELECTRONIC DEVICE WITH FUNCTION OF REPLYING TO MESSAGE BASED ON RECEIVER ENVIRONMENT AND METHOD THEREOF

(75) Inventor: Xi Lin, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 286 days.

(21) Appl. No.: 13/340,700

(22) Filed: Dec. 30, 2011

(65) Prior Publication Data

US 2013/0156172 A1    Jun. 20, 2013

(30) Foreign Application Priority Data

Dec. 14, 2011   (CN) .......................... 2011 1 0416765

(51) Int. Cl.
*H04M 11/00*   (2006.01)
(52) U.S. Cl.
CPC .................................... *H04M 11/00* (2013.01)
USPC ................... 379/93.01; 379/90.01; 379/88.1; 455/415; 455/412.1; 455/418

(58) Field of Classification Search
USPC ............. 379/93.01, 90.01, 80, 88.1; 455/415, 455/412, 413, 418, 455, 466, 558; 715/735
See application file for complete search history.

(56) References Cited

U.S. PATENT DOCUMENTS

2001/0028709 A1* 10/2001 Makela et al. ........... 379/214.01
2011/0151838 A1*  6/2011 Olincy et al. .............. 455/412.1

* cited by examiner

*Primary Examiner* — Melur Ramakrishnaiah
(74) *Attorney, Agent, or Firm* — Novak Druce Connolly Bove + Quigg LLP

(57) ABSTRACT

An electronic device with a function of replying to a message based on the environment of the receiver is provided. The electronic device includes a storage unit, a receiving module, a determining module, a detecting module, an acquiring module, and a sending module. The storage unit stores an environment table which records relationships between receiver-environments and suitable replies. The receiving module receives a short message from a sending phone number. The determining module collects information to determine a current receiver-environment of the user of the electronic device. The detecting module detects an existing reply matching the current receiver-environment in the environment table. The acquiring module acquires the reply matching the current environment and the sending module sends a message which includes the acquired reply to the sending phone number.

18 Claims, 2 Drawing Sheets

ELECTRONIC DEVICE WITH FUNCTION OF REPLYING TO MESSAGE BASED ON RECEIVER ENVIRONMENT AND METHOD THEREOF

BACKGROUND

1. Technical Field

The present disclosure relates to electronic devices and, particularly, to an electronic device with a function of replying to a message based on the environment of the receiver and a method thereof.

2. Description of Related Art

It is easy to generate a misunderstanding between a call-sender and the call-receiver, when the receiver is very busy, and there is no time for the receiver to immediately reply to an incoming information or to a short message from the sender.

Therefore, what is needed is an electronic device with a function of replying to a message based on receiver-environment to overcome the described limitations.

DETAILED DESCRIPTION

Figure 1:
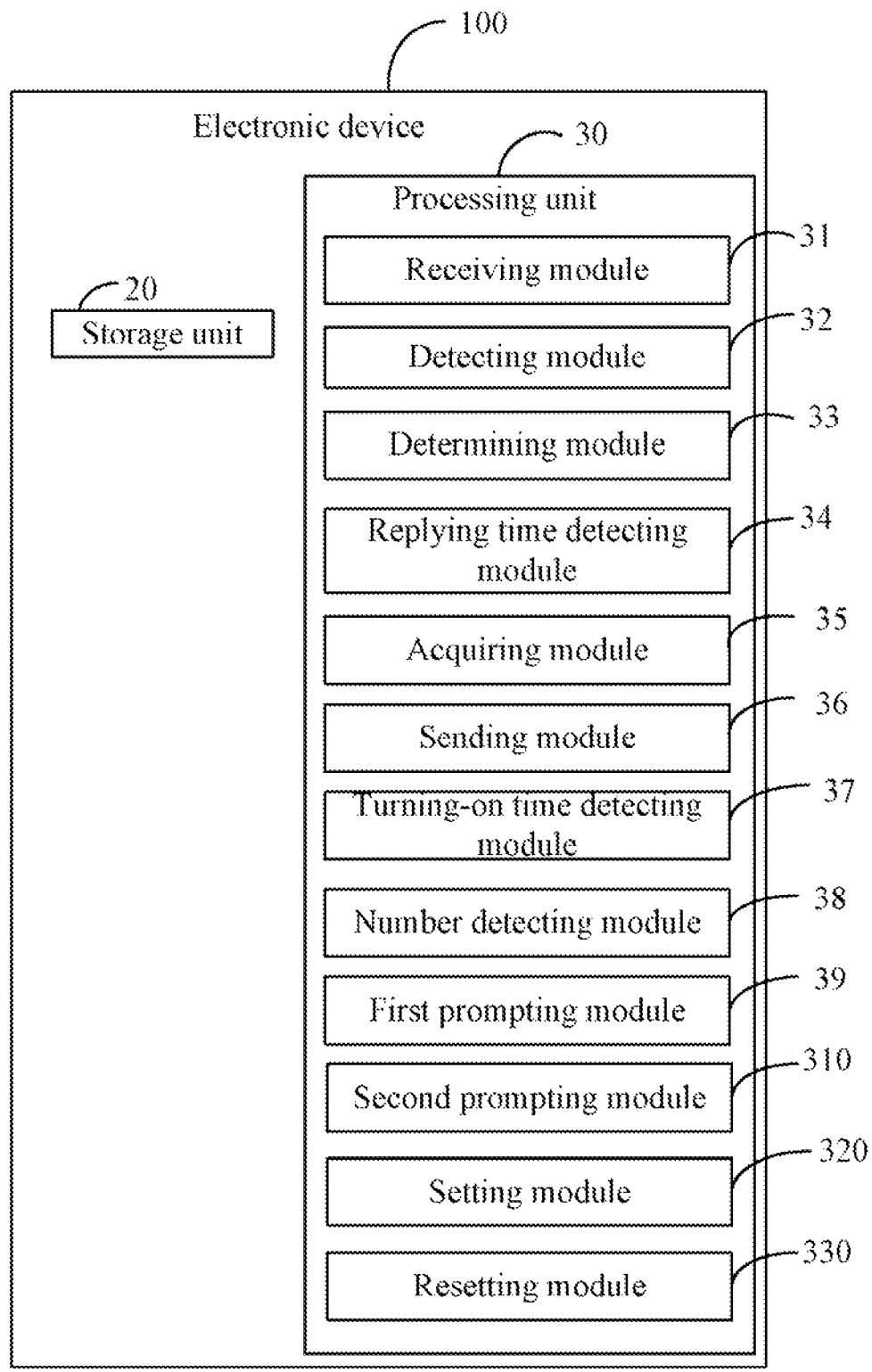
FIG. 1 is a block diagram of the hardware infrastructure of an electronic device with a function of replying to a message based on receiver-environment, in accordance with an exemplary embodiment.

FIG. 1 shows an electronic device 100 with a function of replying automatically to a message based on the circumstances in which a receiver of the message happens to be when the message is received (receiver-environment). The electronic device 100 includes a storage unit 20 and a processing unit 30. The storage unit 20 stores an environment table which records relationships between receiver-environments and suitable replies.

The processing unit 30 includes a receiving module 31, a determining module 33, a detecting module 32, an acquiring module 35, and a sending module 36.

The receiving module 31 receives a short message from a sending phone numbers.

The determining module 33 collects environment information to determine a current receiver-environment of the electronic device 100. In one embodiment, the environment information may be visual information or audible information, or a combination thereof. The technology for collecting the environment information to determine the current receiver-environment of the electronic device 100 is a well known technology, so the description for this technology is taken as read.

The detecting module 32 detects whether there is a reply matching the current receiver-environment of the electronic device 100 in the environment table stored in the storage unit 20.

The acquiring module 35 acquires the reply matching the current receiver-environment when there is a reply matching the current receiver-environment of the electronic device 100 in the environment table.

The sending module 36 sends a message which includes the acquired reply to the sending phone number.

Furthermore, the storage unit 20 stores a predetermined period of replying time. The processing unit 30 includes a replying time detecting module 34. The replying time detecting module 34 detects whether the received short message is replied to by a user within the predetermined period of replying time. The determining module 33 collects the environment information to determine a current receiver-environment of the electronic device 100 when the received short message is not replied to manually by a user within the predetermined period of replying time.

Furthermore, the storage unit 20 stores a predetermined period of turning-on time. The processing unit 30 includes a turning-on time detecting module 37 which detects whether a moment of receiving the short message is within the predetermined period of turning-on time. The replying time detecting module 34 detects whether the received short message is replied to manually by a user within the predetermined period of replying time when the moment that of receiving the short message is received within the predetermined period of turning-on time. According to the setting as described above, the user can conveniently set the time after which the automatic function of replying to a message based on environment will start. For example, when the user is very busy within a period of time, he can invoke the automatic function of replying to apply immediately, but when the user is free for another period of time, he can set the automatic function of replying to commence later, and reply to the message manually (by himself).

Furthermore, the storage unit 20 stores a number of predetermined phone numbers. The processing unit 30 includes a number detecting module 38 and a first prompting module 39. The number detecting module 38 detects whether the phone number which generates the short message to the receiving module 31 is one of the number of predetermined phone numbers if the received short message is not replied to by a user within the predetermined period of replying time. The determining module 33 collects environment information to determine the current circumstances in which the user of the electronic device 100 finds him when the sending phone number is not one of the predetermined phone numbers. Otherwise, the first prompting module 39 repeatedly prompts the user until the user replies to the received short message. In one embodiment, the predetermined phone numbers may be significant for certain reasons, such as belonging to the boss. That is, when the sending phone number is one of the predetermined phone numbers, it means that the short message is important, and needs a precise and manual reply, so the first prompting module 39 will repeatedly prompt the user until the user replies to the received short message. Otherwise, it is useful to start the automatic function of replying for short messages which are less important.

In another embodiment, the determining module 33 collects environment information to determine the current receiver-environment of the electronic device 100 when the sending phone number is one of the predetermined phone numbers. Otherwise, the first prompting module 39 repeatedly prompts the user until the user replies to the received short message when the sending phone number is not one of the predetermined phone numbers.

Furthermore, the processing unit 30 includes a second prompting module 310 and a setting module 320. The second prompting module 310 prompts the user to set a reply in the environment table to match or be appropriate for the particular environment in which the user might be when there is not an existing reply matching the current receiver-environment of the user in the environment table. The setting module 320 may set a reply to match a number of different current receiver-environments in the environment table according to a user input, thereby extending and optimizing the environment table stored in the storage unit 20.

Furthermore, the processing unit 30 includes a resetting module 330. The resetting module 330 resets the predetermined period of turning-on time, the predetermined period of replying time, and the environment table.

Figure 2:
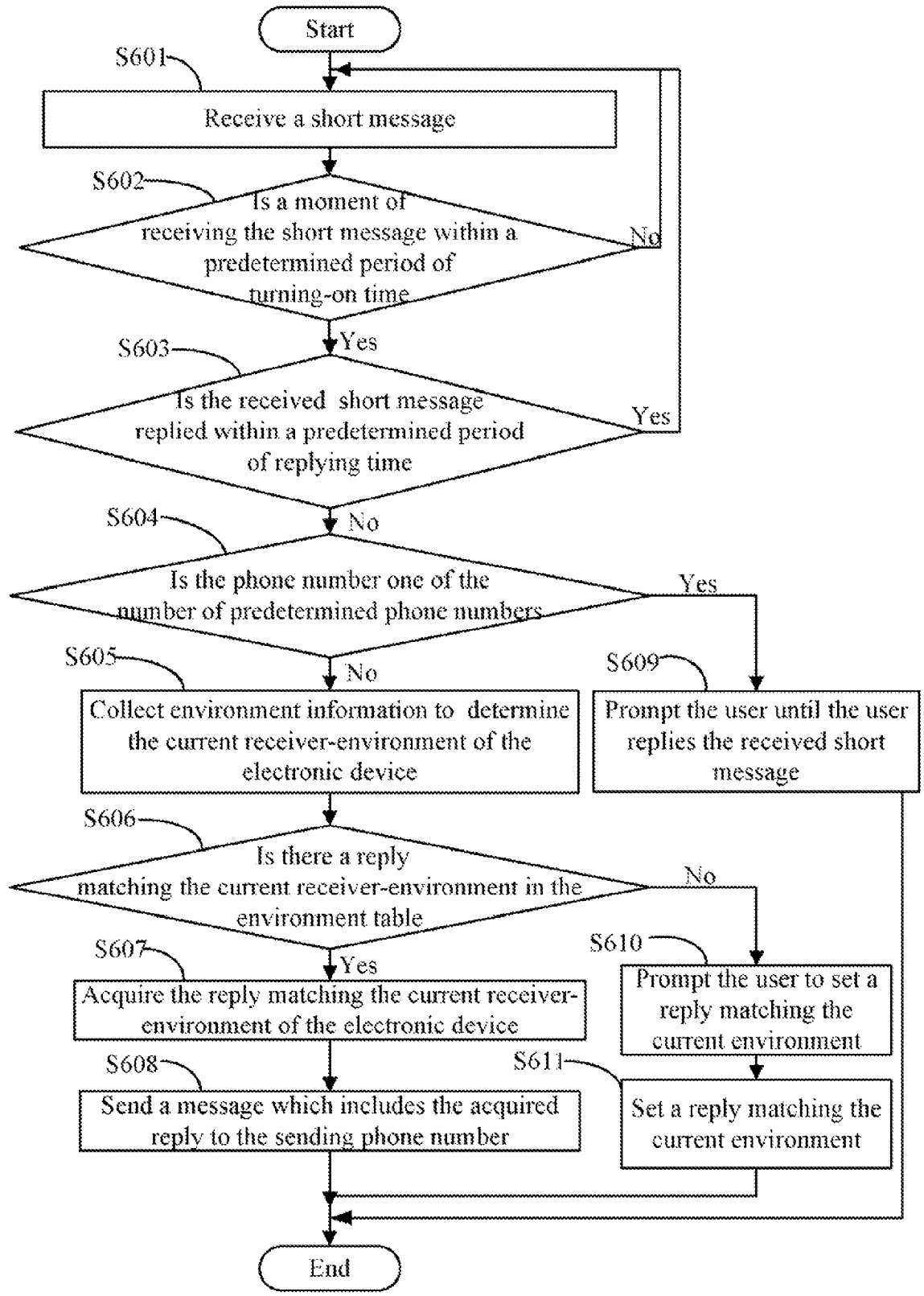
FIG. 2 is a flowchart of a method for replying to a message based on the receiver-environment implemented by the electronic device of FIG. 1, in accordance with an exemplary embodiment.

FIG. 2 is a flowchart of a method for replying to a message based on the receiver-environment as implemented by the electronic device of FIG. 1, in accordance with an exemplary embodiment.

In step S601, the receiving module 31 receives a short message from a sending phone number.

In step S602, the turning-on time detecting module 37 detects whether at the moment of receiving the short message, that moment is within the predetermined period of turning-on time, if yes, the procedure goes to step S603, if no, the procedure goes to step S601.

In step S603, the replying time detecting module 34 detects whether the received short message is replied to manually by a user within the predetermined period of replying time, if yes, the procedure goes to step S601, if no, the procedure goes to step S604.

In step S604, the number detecting module 38 detects whether the sending phone number is one of the number of predetermined phone numbers, if yes, the procedure goes to step S609, if no, the procedure goes to step S605.

In step S605, the determining module 33 collects environment information to determine the current receiver-environment of the user of the electronic device 100.

In step S606, the detecting module 32 detects whether there is a reply matching the current receiver-environment of the user of the electronic device 100 in the environment table stored in the storage unit 20, if yes, the procedure goes to step S607, if no, the procedure goes to step S610.

In step S607, the acquiring module 35 acquires the reply matching the current environment of the electronic device 100.

In step S608, the sending module 36 sends a message which includes the acquired reply to the sending phone number.

In step S609, the first prompting module 39 repeatedly prompts the user until the user replies manually to the received short message.

In step S610, the second prompting module 310 prompts the user to set a reply matching the current environment in which the user of the electronic device 100 finds himself, into the environment table.

In step S611, the setting module 320 sets or adds a reply to match the current receiver-environment of the user of the electronic device 100 in the table, according to the user input.

The method further includes step as follows: the resetting module 330 resets the predetermined period of turning-on time, the predetermined period of replying time, and the environment table.

In another embodiment, the method further includes steps as follows: the determining module 33 collects environment information to determine the receiver-environment of the user of the electronic device 100 when the sending phone number is one of the predetermined and stored phone numbers. Otherwise, the first prompting module 39 repeatedly prompts the user until the user replies manually to the received short message when the sending phone number is not one of the predetermined phone numbers.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device with a function of replying to a message based on receiver-environment comprising:
   a storage unit storing an environment table which records relationships between receiver-environments and replies;
   a processing unit; and
   a plurality of modules to be executed by the processing unit, wherein the plurality of modules comprises:
      a receiving module configured to receive a short message from a sending phone number;
      a determining module configured to collect environment information to determine a current receiver-environment of the electronic device;
      a detecting module configured to detect whether there is a reply corresponding to the current receiver-environment of the electronic device in the environment table;
      an acquiring module configured to acquire the reply corresponding to the current receiver-environment of the electronic device when there is a reply matching the current receiver-environment of the electronic device in the environment table; and
      a sending module configured to send a message which comprises the acquired reply to the sending phone number.

2. The electronic device as described in claim 1, the plurality of modules to be executed by the processing unit further comprising:
   a replying time detecting module configured to detect whether the received short message is replied to manually by a user within a predetermined period of replying time stored in the storage unit; and
   wherein the determining module collects the environment information to determine the current environment of the electronic device when the received short message is not replied to manually by a user within the predetermined period of replying time.

3. The electronic device as described in claim 2, the plurality of modules to be executed by the processing unit further comprising:
   a turning-on time detecting module configured to detect whether a moment of receiving the short message is within a predetermined period of turning-on time stored in the storage unit; and
   wherein the replying time detecting module detects whether the received short message is replied to manually by a user within the predetermined period of replying time stored in the storage unit when the moment of receiving the short message is within the predetermined period of turning-on time.

4. The electronic device as described in claim 2, the plurality of modules to be executed by the processing unit further comprising:
   a number detecting module configured to detect whether the phone number which sends the short message to the receiving module is one of a plurality of predetermined phone numbers stored in the storage unit when the received short message is not replied to manually by a user within the predetermined period of replying time; and
   wherein the determining module collects environment information to determine the current receiver-environment of the electronic device when the phone number which sends the short message to the receiving module is not one of the predetermined phone numbers.

5. The electronic device as described in claim 1, the plurality of modules to be executed by the processing unit further comprising:
a second prompting module configured to prompt the user to set a reply matching the current receiver-environment of the electronic device in the environment table when there is not a reply matching the current environment of the electronic device in the environment table; and
a setting module configured to set a reply matching the current receiver-environment of the electronic device in the environment table according to a user input.

6. The electronic device as described in claim 3, the plurality of modules to be executed by the processing unit further comprising:
a resetting module configured to reset the predetermined period of turning-on time, the predetermined period of replying time, and the environment table.

7. The electronic device as described in claim 4, the plurality of modules to be executed by the processing unit further comprising:
a first prompting module configured to repeatedly prompt the user until the user replies to manually the received short message when the phone number which sends the short message to the receiving module is one of the predetermined phone numbers.

8. An electronic device with a function of replying to a message based on receiver-environment comprising:
a storage unit storing a predetermined period of replying time, a plurality of predetermined phone numbers, and an environment table, the environment table records relationships between receiver-environments and replies;
a processing unit; and
a plurality of modules to be executed by the processing unit, wherein the plurality of modules comprises:
a receiving module configured to receive a short message from a sending phone number;
a replying time detecting module configured to detect whether the received short message is replied to manually by a user within the predetermined period of replying time;
a number detecting module configured to detect whether the phone number which sends the short message to the receiving module is one of the plurality of predetermined phone numbers when the received short message is not replied to manually by a user within the predetermined period of replying time;
a determining module configured to collect environment information to determine a current receiver-environment of the electronic device when the phone number which sends the short message to the receiving module is one of the plurality of predetermined phone numbers;
a detecting module configured to detect whether there is a reply corresponding to the current receiver-environment of the electronic device in the environment table;
an acquiring module configured to acquire the reply corresponding to the current receiver-environment when there is a reply matching the current receiver-environment of the electronic device in the environment table; and
a sending module configured to send a message which comprises the acquired reply to the sending phone number.

9. The electronic device as described in claim 8, the plurality of modules to be executed by the processing unit further comprising:
a first prompting module configured to repeatedly prompt the user until the user replies manually the received short message when the phone number which sends the short message to the receiving module is not one of the predetermined phone numbers.

10. A method for replying to a message based on receiver-environment implemented by an electronic device, wherein the electronic device comprises a storage unit storing an environment table which records relationships between receiver-environments and replies; the method comprising:
receiving a short message from a sending phone number;
collecting environment information to determine a current receiver-environment of the electronic device;
detecting whether there is a reply corresponding to the current receiver-environment of the electronic device in the environment table;
acquiring the reply corresponding to the current receiver-environment when there is a reply matching the current receiver-environment of the electronic device in the environment table; and
sending a message which comprises the acquired reply to the sending phone number.

11. The method as described in claim 10, further comprising:
detecting whether the received short message is replied to manually by a user within a predetermined period of replying time stored in the storage unit; and
collecting the environment information to determine a current receiver-environment of the electronic device when the received short message is not replied to manually by a user within the predetermined period of replying time.

12. The method as described in claim 11, further comprising:
detecting whether a moment of receiving the short message is within a predetermined period of turning-on time stored in the storage unit; and
detecting whether the received short message is replied to manually by a user in the predetermined period of replying time stored in the storage unit when the moment of receiving the short message is within the predetermined period of turning-on time.

13. The method as described in claim 11, further comprising:
detecting whether the phone number which sends the short message to the receiving module is one of a plurality of predetermined phone numbers stored in the storage unit when the received short message is not replied to manually by a user within the predetermined period of replying time; and
collecting environment information to determine the current receiver-environment of the electronic device when the phone number which sends the short message to the receiving module is not one of the predetermined phone numbers.

14. The method as described in claim 10, further comprising:
prompting the user to set a reply matching the current receiver-environment of the electronic device in the environment table when there is not a reply matching the current receiver-environment of the electronic device in the environment table; and
setting a reply matching the current receiver-environment of the electronic device in the environment table according to a user input.

15. The method as described in claim 12, further comprising:

resetting the predetermined period of turning-on time, the predetermined period of replying time, and the environment table.

16. The method as described in claim 13, further comprising:

repeatedly prompting the user until the user replies to manually the received short message when the phone number which generates the short message to the receiving module is one of the predetermined phone numbers.

17. A method for replying to a message based on receiver-environment implemented by an electronic device, wherein the electronic device comprises a storage unit storing a predetermined period of replying time, a plurality of predetermined phone numbers, and an environment table which records relationships between environments and replies; the method comprising:

receiving a short message from a sending phone number;

detecting whether the received short message is replied to manually by a user within the predetermined period of replying time;

detecting whether the phone number which sends the short message to the receiving module is one of the plurality of predetermined phone numbers stored in the storage unit when the received short message is not replied to manually by a user within the predetermined period of replying time;

collecting environment information to determine a current receiver-environment of the electronic device when the phone number which sends the short message to the receiving module is one of the plurality of predetermined phone numbers;

detecting whether there is a reply corresponding to the current receiver-environment of the electronic device in the environment table;

acquiring the reply corresponding to the current receiver-environment when there is a reply matching the current receiver-environment of the electronic device in the environment table; and sending a message which comprises the acquired reply to the sending phone number.

18. The method as described in claim 17, further comprising:

repeatedly prompting the user until the user replies manually the received short message when the phone number which sends short message to the receiving module is not one of the predetermined phone numbers.

\* \* \* \* \*